(12) United States Patent
Sunderland et al.

(10) Patent No.: US 10,030,900 B2
(45) Date of Patent: Jul. 24, 2018

(54) SECONDARY FLUID VALVE AND SYSTEM

(71) Applicant: Parker-Hannifin Corporation, Cleveland, OH (US)

(72) Inventors: Ted W. Sunderland, Washington, MO (US); Patrick W. Bundy, Mooresville, NC (US); Craig M. Obermark, Washington, MO (US)

(73) Assignee: PARKER-HANNIFIN CORPORATION, Cleveland, OH (US)

( * ) Notice: Subject to any disclaimer, the term of this patent is extended or adjusted under 35 U.S.C. 154(b) by 599 days.

(21) Appl. No.: 14/418,729

(22) PCT Filed: Jan. 28, 2013

(86) PCT No.: PCT/US2013/023406
§ 371 (c)(1),
(2) Date: Jan. 30, 2015

(87) PCT Pub. No.: WO2014/021931
PCT Pub. Date: Feb. 6, 2014

(65) Prior Publication Data
US 2015/0204595 A1    Jul. 23, 2015

Related U.S. Application Data

(60) Provisional application No. 61/678,323, filed on Aug. 1, 2012.

(51) Int. Cl.
*F25B 49/02* (2006.01)
*F16K 1/02* (2006.01)
(Continued)

(52) U.S. Cl.
CPC ............. *F25B 49/027* (2013.01); *F16K 1/02* (2013.01); *F16K 25/00* (2013.01); *F24F 11/83* (2018.01);
(Continued)

(58) Field of Classification Search
CPC . F16K 1/02; F16K 25/00; F24F 11/008; F24F 11/0082; F25B 41/062; F25B 2600/2513; F25B 2600/2515
(Continued)

(56) References Cited

U.S. PATENT DOCUMENTS

| 5,867,998 A | 2/1999 | Guertin |
| 2003/0140638 A1 | 7/2003 | Arshansky |
(Continued)

FOREIGN PATENT DOCUMENTS

| EP | 0343849 | * 11/1989 | ............... B60T 8/34 |
| EP | 0 344 444 | 12/1989 | |
| WO | 2011/062944 | 5/2011 | |

OTHER PUBLICATIONS

International Search Report and Written Opinion dated Sep. 30, 2012 for corresponding International application No. PCT/US2013/023406.

*Primary Examiner* — Jianying Atkisson
*Assistant Examiner* — Joel Attey
(74) *Attorney, Agent, or Firm* — Renner Otto Boisselle and Sklar

(57) ABSTRACT

A device, method and system is provided for regulating an ambient condition of a space via a heat exchanger that transfers heat energy from a secondary fluid to a primary fluid, and a flow control valve in fluid communication with the heat exchanger to vary a flow of the secondary fluid through the heat exchanger to provide a continuous flow of the secondary fluid between a minimum flow rate and a maximum flow rate. While in a first mode for regulating the ambient condition of the space, the flow control valve is modulated so as to provide variable and continuous flow of the secondary fluid through the heat exchanger to regulate the ambient condition to a desired target ambient condition. While in a pull-down mode for recovering after a defrost cycle of the heat exchanger, the flow control valve is modulated so as to provide variable and continuous flow of the secondary fluid through the heat exchanger to regulate a temperature drop of the secondary fluid across the heat exchanger.

6 Claims, 9 Drawing Sheets

(51) Int. Cl.
*F16K 25/00* (2006.01)
*F25B 41/04* (2006.01)
*F25B 25/00* (2006.01)
*F24F 11/83* (2018.01)
*F25B 41/06* (2006.01)
*F24F 11/84* (2018.01)
*F24F 11/85* (2018.01)

(52) U.S. Cl.
CPC ............ *F25B 25/005* (2013.01); *F25B 41/04* (2013.01); *F24F 11/84* (2018.01); *F24F 11/85* (2018.01); *F25B 41/062* (2013.01); *F25B 2600/13* (2013.01); *F25B 2600/2513* (2013.01); *F25B 2600/2515* (2013.01); *F25B 2700/197* (2013.01); *F25B 2700/1933* (2013.01); *F25B 2700/21151* (2013.01); *F25B 2700/21171* (2013.01); *F25B 2700/21175* (2013.01); *Y02B 30/745* (2013.01)

(58) Field of Classification Search
USPC ........................................................ 165/295
See application file for complete search history.

(56) References Cited

U.S. PATENT DOCUMENTS

2005/0205140 A1* 9/2005 Hull ..................... G05D 7/0126
                                                     137/613
2010/0077920 A1* 4/2010 Baksh .................. B01D 53/047
                                                      95/97

\* cited by examiner

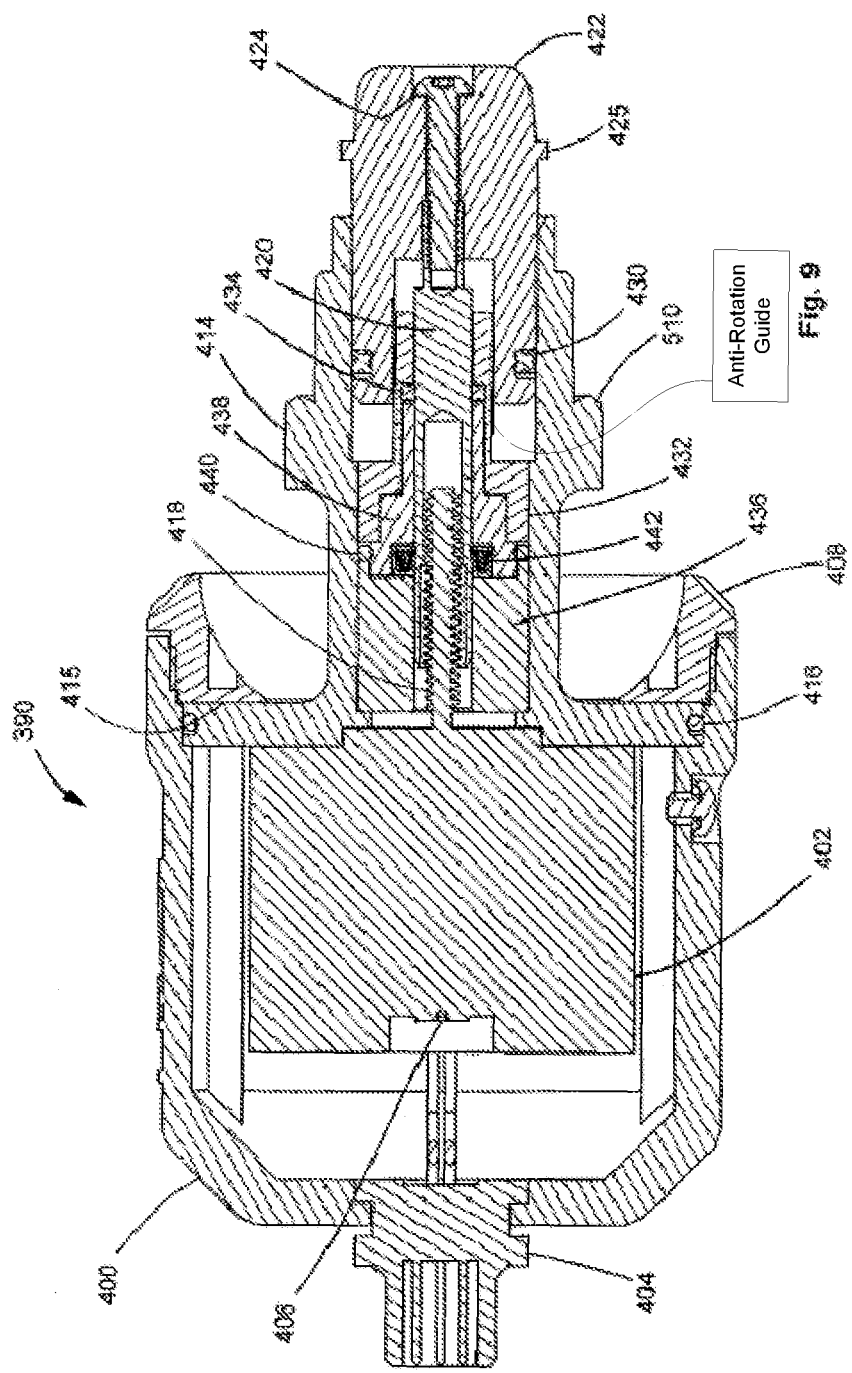

SECONDARY FLUID VALVE AND SYSTEM

RELATED APPLICATION DATA

This application is a national phase of International Application No. PCT/US2013/023406 filed Jan. 23, 2013 and published in the English language.

This application claims priority of U.S. Provisional Application No. 61/678,323 filed on Aug. 1, 2012, which is incorporated herein by reference in its entirety.

TECHNICAL FIELD

The present invention relates to heating, cooling and/or dehumidification of a space. The present invention also relates to a flow control valve that can be used, for example, in heating, cooling and/or dehumidification systems.

BACKGROUND

A secondary loop refrigeration system typically incorporates two different refrigerants to provide cooling. In FIG. 1 an exemplary secondary loop refrigeration system 10 is shown. The system includes a primary loop 12 that is a traditional direct expansion design using a phase change refrigerant (e.g., R-404A). A compressor 14 raises the pressure of the refrigerant in the primary loop 12, thereby causing the refrigerant to circulate within the loop. The high-pressure refrigerant passes through an expansion valve 16, which reduces the pressure of the refrigerant and thus causes it to absorb heat from higher temperature surroundings.

The primary loop 12 is typically restricted to a machine room (not shown), and a primary heat exchanger 18 (e.g., a chiller) is used to transfer energy from the primary loop 12 to a secondary loop 20. In most applications, the refrigerant in the secondary loop 20 is a benign single-phase fluid that is circulated by a pump 22 to individual heat exchangers (not shown). Secondary refrigerants are usually liquids, such as water, brine, propylene glycol, etc. The secondary refrigerant absorbs energy by increasing temperature as it passes through the individual heat exchangers in the refrigerated spaces 24. The warmer refrigerant is then returned to the chiller 18, rejecting the heat to the primary refrigerant.

Flow of a refrigerant in a secondary loop 20 is typically regulated by a fixed flow rate valve 26, which maintains a constant (fixed) flow of the secondary refrigerant in the secondary loop 20. In this manner, a constant amount of refrigerant can be circulated through the secondary loop 20 per unit of time. Further, the temperature of the secondary refrigerant is typically regulated by interrupting the flow of the refrigerant to the chiller 18, e.g., by turning the flow valve off when the temperature of the secondary refrigerant drops below a predetermined threshold, and turning the flow valve on when the temperature of the secondary refrigerant rises above a predetermined threshold. To turn the flow valves on and off, a solenoid 28 can be coupled to the flow valve, thereby enabling selective control of the flow valve state.

Secondary loop refrigeration systems can be advantageous as they allow the amount of primary refrigerant to be minimized. In addition, secondary loop refrigeration systems maintain the primary refrigerant in a plant room where it can be closely supervised (thereby minimizing the risk of inadvertent discharge of the primary refrigerant and reducing the amount of refrigerant that is required in the system). Further, due to simplified piping, advances in circulating pumps, and reduction in system components, secondary loop systems tend to have lower initial costs when compared to costs of equivalent standard direct expansion systems.

SUMMARY

While temperature regulation and flow control of secondary loop systems have been proven to operate satisfactorily, there is room for improvement. More specifically, the temperature of the secondary refrigerant in conventional systems tends to vary (i.e., poor temperature regulation), resulting in inefficiencies in the system. Also, the ON/OFF cycling of the secondary refrigerant flow results in an unstable load on the primary loop, which requires increased compressor cycling (and thus increased operating costs and decreased efficiencies).

An apparatus, system and method in accordance with the present invention enables replacement of existing fixed flow rate balancing valves and ON/OFF solenoid temperature control with an alternative control methodology that improves system operation. More specifically, a flow rate of the refrigerant in the secondary loop is continuously variable between a minimum flow rate and a maximum flow rate (e.g., 0-100% flow control) to provide variable and continuous fluid flow, thereby improving temperature regulation and decreasing compressor cycling.

In accordance with one aspect of the invention, a stepper motor or the like is operatively coupled to a flow control valve, and a controller is operatively coupled to the stepper motor. By implementing a stepper motor and controller with the control the valve, the flow of the secondary refrigerant through the secondary loop can be variable and continuous so as to optimize temperature control and minimize operating costs.

The controller may be equipped with a control algorithm that uses, for example, three temperature inputs to accurately and effectively control temperature in a refrigerated space. The three temperature inputs may include discharge air temperature, coil inlet temperature and coil outlet temperature. In addition, valve position and/or actual fluid flow rate may be provided to the controller to further optimize temperature regulation. In this regard, the controller modulates the control valve based on a position of the valve as tracked by the controller and/or provided by a valve position sensor input (or feedback) and/or a fluid flow rate as provided by a flow rate sensor input.

During normal operation the system regulates discharge air temperature (or other parameter to be regulated) by varying flow of the secondary refrigerant in the secondary loop. When the temperature drop across the heat exchanger coils is less than a preset amount, the system switches from regulating the discharge air temperature (or other parameter) to regulating the temperature drop across the coils (again, by varying flow in the secondary loop).

The valve can include a sealed shaft or push rod for controlling fluid flow through the valve, and/or can have a balanced single-piece piston design. More specifically, by varying the position of the shaft or push-rod, the valve, in particular the piston, can be driven to modulate flow through the valve. The seal for the shaft or push rod may include one or more spring energized seals, in particular one or more spring energized filled PTFE reciprocating seal(s).

The stepper motor can be directly coupled to the sealed shaft so as to enable adjustment of a position of the valve piston and thus to effect a desired flow rate through the valve. A motor assembly, which can include the stepper motor coupled to the sealed shaft and piston assembly mounted into a motor enclosure, can serve as a replaceable cartridge. The motor enclosure protects the motor from the ambient environment, freeze thaw, and water spray. In addition, the stepper motor itself is not exposed to the working fluid. The motor assembly can be attached to a valve body that includes mating fittings for attachment to the system, flow passages, and a valve port. The removable adapter assembly allows the moving parts of the assembly to be removed and replaced without impacting the system piping.

During operation, the valve position is modulated to achieve and maintain a desired discharge air temperature set point using an adaptive control strategy. This performs a very stable temperature control and maintains a fluid flow rate at a stable minimum level.

Alternatively or additionally, a controller is provided for regulating an ambient condition of a space via a heat exchanger that transfers heat energy from a secondary fluid to a primary fluid, and a flow control valve in fluid communication with the heat exchanger to vary a flow of the secondary fluid through the heat exchanger to provide a continuous flow of the secondary fluid between a minimum flow rate and a maximum flow rate. The controller includes a processor and memory; and logic stored in the memory and executable by the processor, the logic configured to cause the processor to i) operate in a first mode for regulating the ambient condition of the space, wherein while in the first mode the controller generates a control command for modulating the flow control valve so as to provide variable and continuous flow of the secondary fluid through the heat exchanger to regulate the ambient condition to a desired target ambient condition, and ii) operate in a pull-down mode for recovering after a defrost cycle of the heat exchanger, wherein while in the pull-down mode the controller generates a control command for modulating the flow control valve so as to provide variable and continuous flow of the secondary fluid through the heat exchanger to regulate a temperature drop of the secondary fluid across the heat exchanger.

Alternatively or additionally, the controller includes an ambient condition sensor input for receiving a measured ambient condition of the space; an inlet temperature sensor input for receiving a measured temperature of the secondary fluid entering an inlet of the heat exchanger; and an outlet temperature sensor input for receiving a measured temperature of the secondary fluid exiting an outlet of the heat exchanger, wherein the controller is configured to calculate the temperature drop of the secondary fluid across the heat exchanger based on the difference between the measured inlet temperature and measured outlet temperature.

Alternatively or additionally, the controller is configured to regulate at least one of a temperature of the space or a humidity of the space.

Alternatively or additionally, the controller includes at least one of a valve position sensor input or a fluid flow rate sensor input, wherein the controller is configured to modulate the control valve based on at least one of a position of the valve as provided by the valve position sensor input or a fluid flow rate as provided by the flow rate sensor input.

Alternatively or additionally, the controller is configured to exit pull-down mode upon the ambient condition being within a predetermined range of a target value.

According to another aspect of the invention, a system for regulating an ambient condition of a space includes: a heat exchanger for transferring heat energy from a secondary fluid to a primary fluid; a flow control valve in fluid communication with the heat exchanger, the flow control valve operative to vary a flow of the secondary fluid through the heat exchanger to provide a continuous flow of the secondary fluid between a minimum flow rate and a maximum flow rate; a controller operatively coupled to the flow control valve, the controller configured to operate in a first mode for regulating the ambient condition of the space, and a pull-down mode for recovering after a defrost cycle of the heat exchanger, wherein while in the first mode the controller modulates the flow control valve so as to provide variable and continuous flow of the secondary fluid through the heat exchanger to regulate the ambient condition to a desired target ambient condition, and while in the pull-down mode the controller modulates the flow control valve so as to provide variable and continuous flow of the secondary fluid through the heat exchanger to regulate a temperature drop of the secondary fluid across the heat exchanger.

Alternatively or additionally, the system includes an ambient condition sensor communicatively coupled to the controller, the ambient condition sensor operative to measure the ambient condition of the space; an inlet temperature sensor communicatively coupled to the controller, the inlet temperature sensor operative to measure a temperature of the secondary fluid entering an inlet of the heat exchanger; and an outlet temperature sensor communicatively coupled to the controller, the outlet temperature sensor operative to measure a temperature of the secondary fluid exiting an outlet of the heat exchanger, wherein the controller is configured to calculate the temperature drop of the secondary fluid across the heat exchanger based on the difference between the measured inlet temperature and measured outlet temperature.

Alternatively or additionally, the ambient condition sensor is at least one of a temperature sensor or a humidity sensor.

Alternatively or additionally, the system includes at least one of a valve position sensor or a fluid flow rate sensor communicatively coupled to the controller, wherein the controller is configured to modulate the control valve based on at least one of a position of the valve as measured by the valve position sensor or a fluid flow rate as measured by the flow rate sensor.

Alternatively or additionally, the controller is configured to exit pull-down mode upon the ambient condition being within a predetermined range of a target value.

Alternatively or additionally, the system is at least one of a refrigeration system, cooling system, heating system, or de-humidification system.

According to one aspect of the invention, the system includes a pump assembly for pumping the secondary fluid through the heat exchanger, the pump assembly including a pump in fluid communication with the heat exchanger and a variable speed drive operatively coupled to the pump, the variable speed drive operative to vary a speed of the pump between a minimum speed and a maximum speed to effect a pressure change of the secondary fluid.

Alternatively or additionally, the system includes a pump assembly for pumping the secondary fluid through the heat exchanger, the pump assembly including a pump in fluid communication with the heat exchanger and a motor operatively coupled to the pump so as to drive the pump at a predetermined speed.

Alternatively or additionally, the pump includes a first fluid inlet and a first fluid outlet, and the system further includes a second flow control valve having a second fluid inlet and a second fluid outlet, wherein the second fluid inlet is in fluid communication with the first fluid inlet, and the second fluid outlet is in fluid communication with the first fluid outlet, and a second controller operatively coupled to the second flow control valve. The second controller is configured to modulate the second flow control valve to regulate a fluid pressure at the first and second fluid outlet.

Alternatively or additionally, the system includes a secondary high-side heat exchanger having a primary side and a secondary side, wherein the primary side is in fluid communication with the primary fluid, and the secondary side is in fluid communication with a third fluid used to heat a space.

Alternatively or additionally, the heated space is at least one of a room or a surface.

According to still another aspect of the invention, a method is provided for regulating an ambient condition of a space via a heat exchanger that transfers heat energy from a secondary fluid to a primary fluid, and a flow control valve in fluid communication with the heat exchanger to vary a flow of the secondary fluid through the heat exchanger to provide a continuous flow of the secondary fluid between a minimum flow rate and a maximum flow rate. According to the method, while in a first mode for regulating the ambient condition of the space, modulating the flow control valve so as to provide variable and continuous flow of the secondary fluid through the heat exchanger to regulate the ambient condition to a desired target ambient condition, and while in a pull-down mode for recovering after a defrost cycle of the heat exchanger, modulating the flow control valve so as to provide variable and continuous flow of the secondary fluid through the heat exchanger to regulate a temperature drop of the secondary fluid across the heat exchanger.

According to yet another aspect of the invention, a flow control valve comprises a stepper motor, an enclosure for the stepper motor, an externally threaded motor shaft driven by the stepper motor, an internally threaded push rod in threaded engagement with the motor shaft such that rotation of the motor shaft will effect axial movement of the push rod, a piston connected to the push rod and having a valve sealing surface for mating with a valve seat of a valve body to which the valve cartridge can be assembled, a guide for guiding axial movement of the push rod, and a seal, in particular a spring energized Polytetrafluoroethylene seal, for sealing the push rod to the guide.

Alternatively or additionally, the guide is housed in an adapter to which the motor enclosure is connected preferably removably by a threaded connection, and the adapter preferably is configured as a cartridge for threaded receipt in a threaded bore of a valve body.

Alternatively or additionally, the push rod is guided for axial movement by the adapter.

Alternatively or additionally, a seal is provided for sealing the piston to an interior surface of the adapter in which the piston is slidably guided.

Alternatively or additionally, the guide includes a bushing, a seal housing and an anti-rotation guide, and preferably the seal is retained between the bushing and the seal housing.

Alternatively or additionally, an annular adapter seal is retained between the bushing and the anti-rotation guide for sealing the guide to the interior of an adapter attached to the motor enclosure.

Alternatively or additionally, the seal 430 enables pressure balancing and tight seating. In particular, the piston preferably is semi-balanced with the imbalance being used to keep the assembly loaded in one direction to take up any clearance or looseness thereby to eliminate hysteresis. The cross-sectional area of the piston bore of the adapter is larger than the cross-sectional area of the valve seat so that pressure applied to the back of the piston keeps the piston pushed out of the bore to take up axial play in the threads.

BRIEF DESCRIPTION OF THE DRAWINGS

Embodiments of this invention will now be described in further detail with reference to the accompanying drawings, in which:

FIG. 9 is cross-sectional view of an exemplary embodiment of a motor adapter assembly, in particular a flow control valve cartridge that can be mounted to a valve body for controlling flow through the valve body;

DETAILED DESCRIPTION

Aspects of the present invention will now be described in the context of a refrigeration system. It is noted, however, that aspects of the invention also can be applied to other applications. For example, the apparatus, system and method in accordance with the present invention, in addition to cooling a space (e.g., refrigeration and air conditioning), also can be applied to heating and/or dehumidification of a space.

Figure 1:
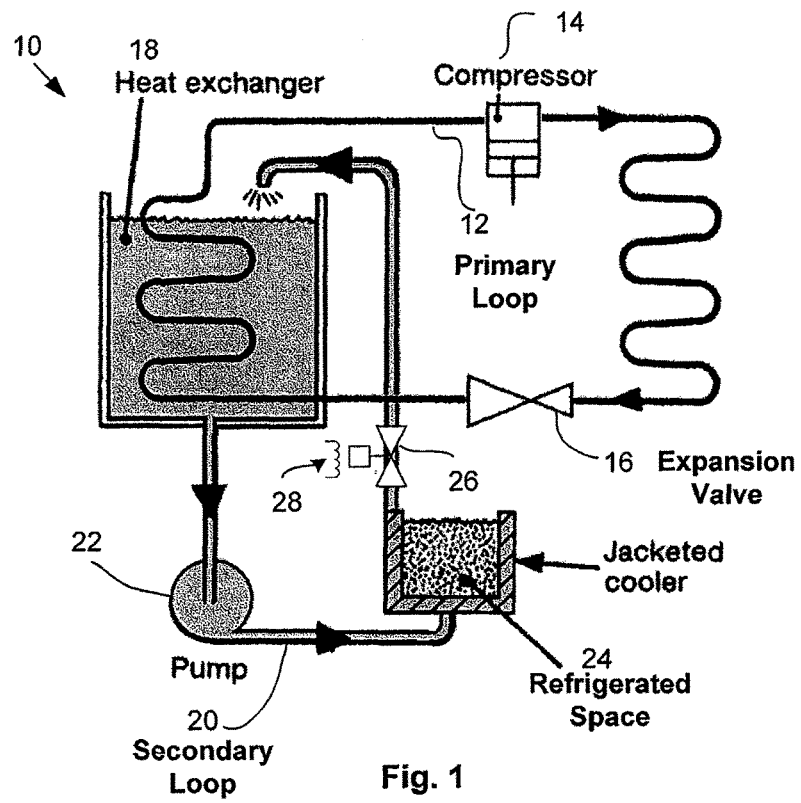
FIG. 1 is a schematic diagram of a conventional secondary loop cooling system.
Figure 3:
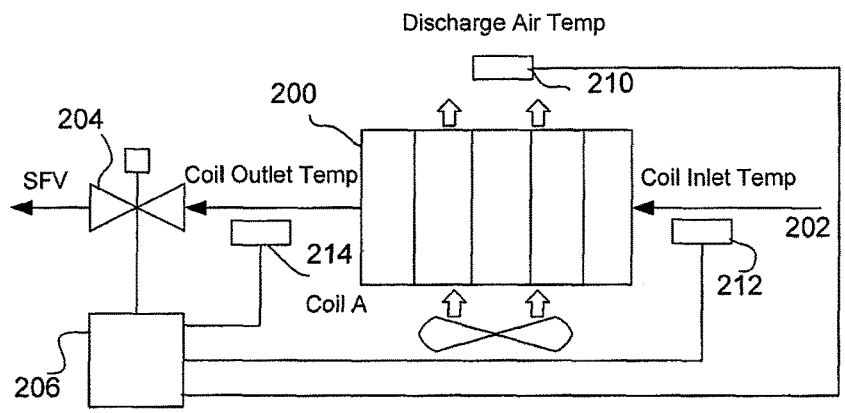
FIG. 3 is a schematic diagram of a branch of the secondary fluid system of FIG. 2.
Figure 2:
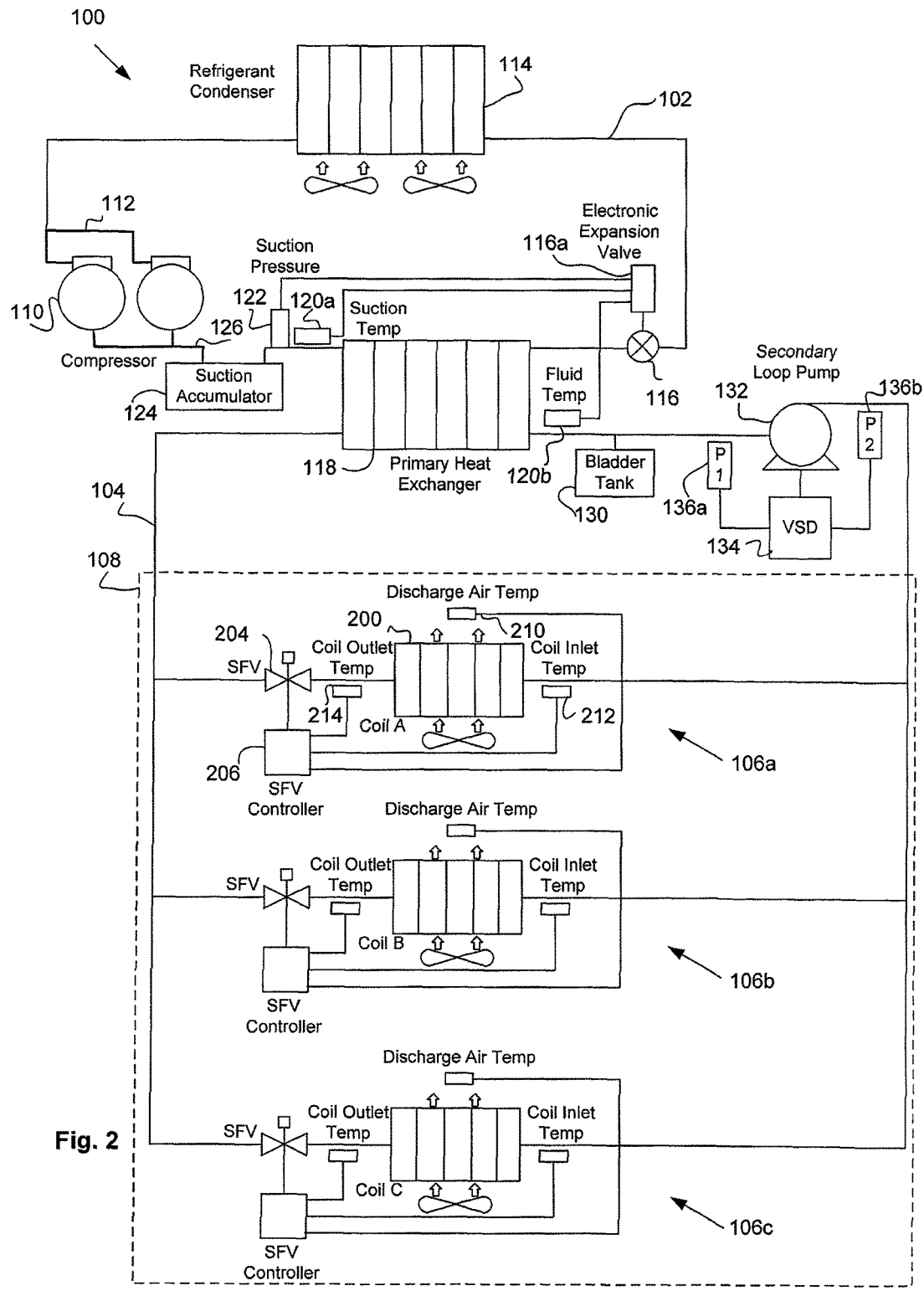
FIG. 2 is a schematic diagram of an exemplary cooling system that includes a secondary fluid system with a secondary fluid valve and controller in accordance with the present invention.

Aspects of an exemplary cooling system 100 in accordance with the present invention are shown in FIGS. 2 and 3. The system 100 includes a primary loop 102 and a secondary loop 104. The secondary loop 104 can include multiple branches 106a-106c which, in the exemplary system, are used to cool a refrigerated space such as a supermarket display case 108. Although branches 106a-106c are shown as all being within a single contained space, the respective branches 106a-106c could be part of individual and separate spaces.

The primary loop 102 can include one or more compressor(s) 110 with outlet(s) coupled to a discharge manifold 112. The compressors 110 pressurize a primary medium (e.g., a fluid, which may be referred to as a primary fluid), which flows through a condenser 114 and discharges heat from the high-pressure fluid to ambient space. The cooled high-pressure fluid then flows from the condenser 114 to an electronic expansion valve 116 controlled by a controller 116a, which subjects the high-pressure fluid to a pressure drop, thereby causing the temperature of the primary fluid to decrease. The low-pressure and low temperature fluid then is provided to a heat exchanger 118, where heat from a secondary medium (e.g., a fluid, which may be referred to as a secondary fluid) is absorbed by the primary fluid.

Temperature sensors 120a and 120b, which are operatively coupled to the expansion valve controller 116a, monitor suction temperature in the primary loop 102 (e.g., the temperature of the primary fluid exiting the heat exchanger 118 in the primary loop 102) and temperature in the secondary loop 104 (e.g., the cooled fluid exiting the heat exchanger 118 in the secondary fluid system 104), respectively. Further, a pressure sensor 122, which is also operatively coupled to the expansion valve controller 116a, monitors suction pressure of the fluid exiting the heat exchanger 118 in the primary fluid system 102. The data provided by the temperature sensors 120a and 120b and the pressure sensor 122 is used by the expansion valve controller 116a to perform, for example, superheat and fluid temperature control, and to check if the fluid is within normal operating parameters. If based on the data provided by the sensors an abnormal situation is detected, then appropriate action can be taken.

In the heat exchanger 118, heat from the secondary fluid is transferred to the primary fluid. The low-pressure primary fluid, now having more heat energy due to interaction with the secondary fluid, flows to a suction accumulator 124, a suction manifold 126 and then back to compressor(s) 110.

The secondary loop 104 can include a bladder tank 130, which receives fluid from the heat exchanger 118 and maintains a constant inlet pressure at the pump. From the tank 130, the fluid flows to a secondary pump 132, which circulates the secondary fluid through the secondary loop. The secondary pump 132 includes a driving means, such as a fixed speed motor, a variable speed drive system 134 (e.g., a motor and controller for varying a speed of the motor), or the like, and may also include one or more pressure sensors 136 and 138 for sensing pressure of the fluid flowing into the pump 132 and out of the pump 132. Data from the pressure sensors 136 and 138 can be used to regulate the pressure in the secondary loop (e.g., the variable speed drive system 134 can vary the speed of the pump 132 so as to achieve a desired pressure differential across the pump and/or a desired output pressure at the pump). The pressure data also can be used to detect abnormal pressure conditions in the secondary loop 104 and, if an abnormal situation is detected, appropriate action can be taken. From the pump 132 the fluid flows to each of the branches 106a-106c, where the fluid absorbs heat from the refrigerated space 108. The heated fluid then is circulated back to the primary heat exchanger 118, where the primary fluid absorbs heat from the secondary fluid.

An exemplary branch (e.g., branch 106a) of the secondary fluid system is shown in FIG. 3. The branch 106a includes a heat exchanger 200, also referred to as a coil, which receives a flow 202 of fluid from the primary heat exchanger 118 (e.g., via the pump 132—the pump is in fluid communication with the heat exchanger 200 and the primary heat exchanger 118). In the heat exchanger 200, the fluid absorbs heat from the air in the refrigerated space 108. The fluid exits the heat exchanger 200 and passes through a secondary fluid valve 204, which meters the flow of the fluid back to the primary heat exchanger 118.

The secondary valve 204 is operatively coupled to a controller 206 that controls a stepper motor (described below) to proportionally modulate the valve 204. The controller 206 is operatively coupled to a plurality of sensors that measure characteristics of the fluid and/or ambient conditions so as to regulate flow of the secondary fluid within the secondary loop 104.

Figure 4:
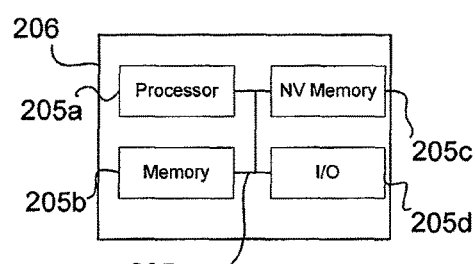
FIG. 4 is a block diagram of an exemplary controller that can execute instructions in accordance with the present invention.

Briefly referring to FIG. 4, the controller 206 includes a processor 205a and memory 205b for executing instructions, non-volatile memory 205c for storing instructions, and input/output ports 205d for providing data to and receiving data from external devices. A bus 205e communicatively couples the processor, non-memory 205b, non-volatile memory 205c and I/O ports 205d to one another. Stored in the non-volatile memory 205c are computer executable instructions for carrying out a regulation methodology as described herein.

The characteristics measured by the sensors can be used to control the valve 204. As shown in FIG. 3, branch 106a includes a sensor 210 for measuring an ambient condition, such as the temperature of the air discharged from the heat exchanger 200, a sensor 212 for measuring the temperature of the fluid entering heat exchanger 200 and a sensor 214 for measuring the temperature of the fluid exiting the heat exchanger 200. These temperatures can be used to control the flow rate of fluid in the heat exchanger 200 to maintain an optimal temperature change across the heat exchanger. More particularly, work in the heat exchanger 200 is characterized by the formula $\dot{Q}=\dot{m}(C_p \cdot \Delta T)$ where:

$\dot{Q}$=Heat Transfer Rate
$\dot{m}$=Mass Flow of the fluid in the coil
$C_p$=Specific Heat of the Fluid
$\Delta T$=Change in Temperature from Coil Inlet to Outlet To achieve and maintain a desired temperature for the refrigerated space, the heat energy $\dot{Q}$ is continually adjusted. This is accomplished, for example, by varying the one controllable term in the equation, $\dot{m}$ (mass flow of the fluid), in accordance with the load requirements of the refrigerated space 108. Assuming the specific heat $C_p$ of the secondary fluid remains nearly constant over the relatively small change in temperature, then fluid temperature change $\Delta T$ across the heat exchanger 200 is the only remaining variable affecting the desired heat energy $\dot{Q}$ and ultimately temperature in the refrigerated space 108.

The fluid temperature change $\Delta T$ across the heat exchanger 200 is affected by changes in the heat transfer coefficient of the heat exchanger 200 and refrigerated air circulation. Additionally, heat transfer rate is influenced by temperature difference between the heat exchanger surface and the circulating air, fluid properties and geometry of the heat exchanger 200. These characteristics can lead to conditions where the effects of increases in mass flow are negated by decreased fluid temperature change $\Delta T$ across the heat exchanger 200. This causes reduced efficiency in heat transfer resulting in wasted liquid circulating pump power.

In accordance with the present invention, during normal operation (e.g., non-defrost and non-pull-down cycles) the position of valve 204 is modulated by the controller 206 to achieve and maintain a desired discharge air temperature set point. This provides very stable temperature control and maintains a fluid flow rate at a stable minimum level.

During a defrost cycle, the temperatures of the heat exchanger 200 and the refrigerated space 108 are typically elevated. To pull the temperature down to the desired setpoint once the defrost cycle is complete, conventional control schemes provide maximum flow rate of the fluid through the heat exchanger 200 to remove the heat from the refrigerated space 108. The maximum flow rate of the fluid through the heat exchanger 200, however, can reduce the efficiency of the fluid. Stated in other terms, the high (maximum) flow rate can adversely affect the rate of heat transfer to the fluid.

According to an aspect of the invention, a control scheme is provided to increase efficiency of the system during temperature pull-down (i.e., temperature recovery after a defrost cycle). For example, during defrost the flow of fluid through the heat exchanger coils is stopped, allowing the relatively warmer air of the refrigerated space to defrost the heat exchanger coils. The discharge air temperature, which is monitored by the temperature sensor 210, climbs during the defrost cycle. When the discharge air temperature reaches a predetermined set point above freezing (or after a predetermined time period has elapsed), the defrost cycle can be considered complete. The valve 204 then can be opened to control the flow of fluid through the heat exchanger coils to pull the temperature down to the desired target temperature. During temperature pull-down, the flow rate of fluid through the heat exchanger 200 can be increased relative to normal "steady state" operation to ensure the heat exchanger 200 is not starved of fluid due to the increased temperature of the heat exchanger and the resultant heating of the fluid associated therewith.

During temperature pull-down, the fluid temperature change ΔT across the heat exchanger 200 can be calculated based on the difference in the fluid temperature entering the heat exchanger 200 and the fluid temperature exiting the heat exchanger (e.g., using the temperature sensors 212 and 214 to measure the respective fluid temperatures and then calculating the difference in temperature between the inlet and outlet of the heat exchanger). The controller 206 then modulates the valve 204 so as to regulate the fluid temperature change ΔT across the heat exchanger 200 as calculated from the temperature sensors 212 and 214. In this regard, the controller 206 seeks to maintain a minimum fluid temperature change ΔT across the heat exchanger 200 to ensure fluid is used efficiently. The preferred minimum temperature drop can be calculated by the controller over a predetermined period of time.

The mass flow rate of the secondary fluid in each branch 106a-c can be individually controlled to increase in response to the increased load and decrease to avoid exceeding the heat transfer rate as indicated by decreased fluid temperature change ΔT across the heat exchanger 200. The flow rate can be controlled by proportional control of the valve 204 via controller 206 in each respective branch. For example, the more open that the valve is, the higher the flow rate will be. This can reduce the amount of time that the fluid spends in the heat exchanger coils to absorb heat. Likewise, the further closed the valve 206 is, the lower the flow rate will be. This will result in the fluid spending more time in the heat exchanger coils thereby allowing the fluid to absorb more heat.

By modulating the valve, the heat transfer can be optimized. This balancing act of mass flow increase and decrease can be handled by augmenting the control algorithm of the valve with a "pull-down mode" to obtain the shortest possible pull-down period while maintaining maximum heat transfer to the fluid. For example, the fluid temperature change ΔT across the heat exchanger can be monitored and, if the temperature change ΔT is below a predetermined level (e.g., the temperature of the fluid at the inlet and the outlet of the heat exchanger 200 are close to one another), then the valve 204 can be partially closed to restrict flow, thereby causing the fluid to spend more time in the heat exchanger coils absorbing heat. Alternatively, if the temperature change ΔT across the heat exchanger 200 is above a predetermined level, then the valve 204 can be further opened to increase the flow of fluid through the heat exchanger coils, thereby reducing the amount of time that the fluid spends in the heat exchanger coils to absorb heat. As will be appreciated, the set points of the fluid temperature change ΔT used to modulate the valve 204 can be customized and may depend in part on the characteristics of the operating fluid.

In addition, a valve position sensor 207a and/or a flow rate sensor 207b can be coupled to the controller 206 to provide valve position (e.g., the position of the valve 204 relative to maximum open) and/or fluid flow rate (e.g., fluid flow rate through the valve 204) to the controller. Such sensors may be actual sensors or virtual sensors (e.g., calculated valve position and/or flow inferred from stepper motor data). The flow rate and valve position can be used by the controller to further enhance control of the valve.

The valve 204 and controller 206 combination (referred to as a "SFV") can provide superior control and energy saving benefits when compared to conventional mechanical balancing valve and solenoid operated valve solutions. The SFV provides a nearly linear capacity control and consequently accurate temperature control and stable, continuous fluid flow. This results in a far more constant load for the primary refrigeration system thus reducing compressor cycling and capacity (energy) requirements. Further, the advantages of implementation of a variable speed drive 134 on the circulating pump 132 are realized to a greater extent as the flow rate demands can be matched to the requirements of a linear flow system.

Figure 5:
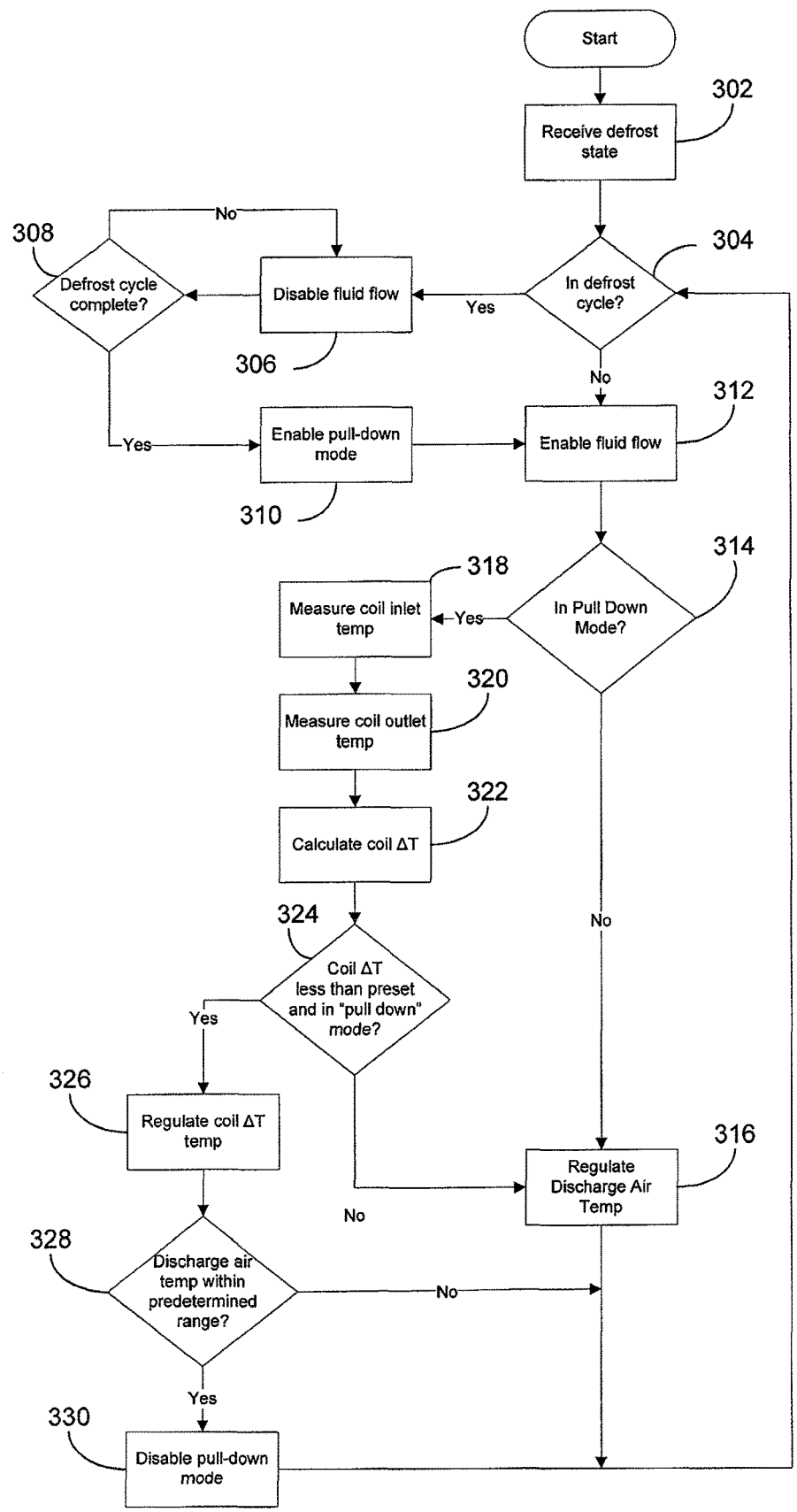
FIG. 5 is a flow chart of an exemplary control methodology in accordance with the present invention.

Moving now to FIG. 5, illustrated are logical operations to implement an exemplary method for controlling temperature of an area, such as a refrigerated area. Thus, the flow chart 300 of FIG. 5 may be thought of as depicting steps of a method carried out by the controller 206. Although FIG. 5 show a specific order of executing functional logic blocks, the order of executing the blocks may be changed relative to the order shown. Also, two or more blocks shown in succession may be executed concurrently or with partial concurrence. Certain blocks also may be omitted. In addition, any number of functions, logical operations, commands, state variables, semaphores or messages may be added to the logical flow for purposes of enhanced utility, accounting, performance, measurement, troubleshooting, and the like. It is understood that all such variations are within the scope of the present invention.

Beginning at step 302, the controller 206 reads a status bit corresponding to whether or not the system is in defrost cycle. In the exemplary flow chart of FIG. 5, determination of whether or not the system is in a defrost cycle is made by an external device, such as a host computer overseeing the entire system. It should be appreciated, however, that the controller 206 could be configured to determine when defrost cycles are to be performed. Next at block 304, it is determined if the status bit indicates the system is or is not in defrost cycle.

If the system is not in a defrost cycle, then the method moves to block 312 and the controller 206 commands the valve 204 to enable fluid flow through the heat exchanger 200. If the system is in a defrost cycle, however, then the method moves to block 304 and the controller 206 commands the valve 204 to inhibit fluid flow through the heat exchanger 200. Without fluid flowing through the heat exchanger 200, the temperature of the fluid remaining in the heat exchanger and thus the temperature of the heat exchanger itself will begin to rise. The rise in temperature will cause any frost formed on the heat exchanger coils to melt, thereby defrosting the system. At block 306 the controller 206 again checks the defrost cycle status bit to determine if the system is still in a defrost cycle. If the system still is in a defrost cycle as determined by the status bit, then the method loops back to block 304 and fluid flow is maintained in the inhibited state. However, if the system is no longer in a defrost cycle as determined by the status bit, then at block 308 the controller enables pull-down mode. Pull-down mode is an operational mode in which the system attempts to recover from the defrost cycle. More specifically, during a defrost cycle the temperature of the heat exchanger 200 as well as the refrigerated space 108 has increased. Pull-down mode brings the temperature of the refrigerated space 108 back to the desired temperature in a timely manner.

After enabling pull-down mode, the method moves to block 312, and the controller 206 commands the valve 204 to enable fluid flow through the heat exchanger 200. At block 314, the controller 206 checks if the system is in pull-down mode. If the system is not in pull-down mode, then the method moves to block 316 and modulates the valve 204 so as to regulate the ambient condition, e.g., the valve is modulated so as to provide variable and continuous flow of the secondary fluid through the heat exchanger to regulate discharge air temperature to a desired target temperature. Regulating the ambient condition, such as the discharge air temperature, is referred to as operating in a first mode.

If the system is in pull-down mode, then the controller moves to blocks 318 and 320, where the controller 206 determines the fluid inlet temperature entering the heat exchanger 200 and the fluid outlet temperature exiting the heat exchanger 200. Such determination is made, for example, via the inlet temperature sensor 212 and the outlet temperature sensor 214. At block 322, the controller 206 calculates the fluid temperature drop ΔT across the heat exchanger 200 by taking the difference between the inlet temperature and the outlet temperature.

At block 324 the controller 206 compares the calculated fluid temperature drop to a predetermined temperature threshold. The predetermined temperature threshold is a calculated minimum value. If the fluid temperature drop ΔT across the heat exchanger 200 is greater than or equal to the predetermined minimum value, then the method moves back to block 314 and the controller modulates the valve 204 so as to regulate the ambient condition, e.g., the discharge air temperature. If the fluid temperature drop ΔT across the heat exchanger 200 is less than the predetermined minimum value, then the method moves to block 326 and the controller 206 modulates the valve 204 so as to regulate the fluid temperature drop across the heat exchanger 200. When regulating the temperature drop across the heat exchanger, the method modulates the flow control valve so as to provide variable and continuous flow of the secondary fluid through the heat exchanger to maintain the temperature drop of the secondary fluid across the heat exchanger about a calculated temperature drop.

Next at block 328 the controller 206 checks if the discharge air temperature as measured by the temperature sensor 210 is within a predetermined range of the desired setpoint (e.g., within 0.5 degrees of the setpoint). If the discharge air temperature is not within the predetermined range of the setpoint, then pull-down mode remains active and the method moves back to block 304. If, however, the discharge air temperature is within the predetermined range of the target, then at block 330 the controller 206 disables pull-down mode and the method moves back to block 304.

Figure 6:
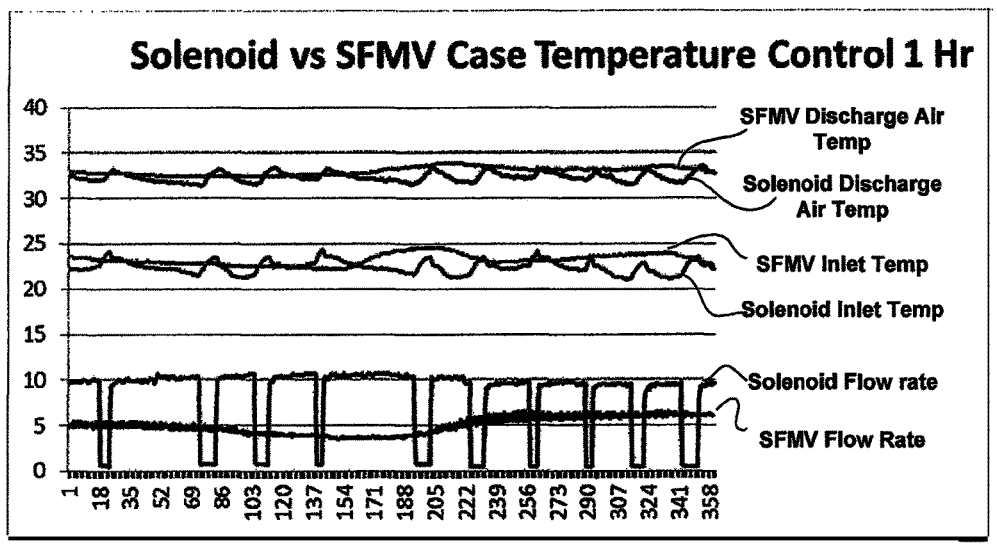
FIG. 6 is a graph comparing case temperature control between a conventional system and a system in accordance with the present invention.

The regulation method in accordance with the present invention provides improved temperature regulation compared to conventional methods, and also reduces compressor cycling. The benefits can be seen, for example, in FIG. 6, which is a graph showing the temperature control performance of a system in accordance with the present invention relative to a conventional solenoid operated valve in combination with a fixed flow valve over a one hour period. As can be seen, the discharge air temperature and inlet fluid temperature of the conventional regulation scheme have a significant ripple (which is due in part to the non-continuous flow of fluid), while the discharge air temperature and fluid inlet temperature of the system in accordance with the present invention have smooth/flat responses. Further, the flow rate of the fluid through the heat exchanger 200 of the conventional system effectively is a square wave. This is due to the on-off actuation of the solenoid operated valve. In contrast, the flow rate of the fluid through the heat exchanger 200 of the system in accordance with the present invention is much smother. This is due to the variable and continuous flow that is made possible by the system and apparatus in accordance with the invention. The smoother fluid flow as provided in the system in accordance with the present invention presents less of a load on the primary loop 102 when compared to the conventional solenoid-operated system, thereby eliminating peaks and spikes in load and resulting less compressor cycling (and thus lower operating costs).

Figure 7:
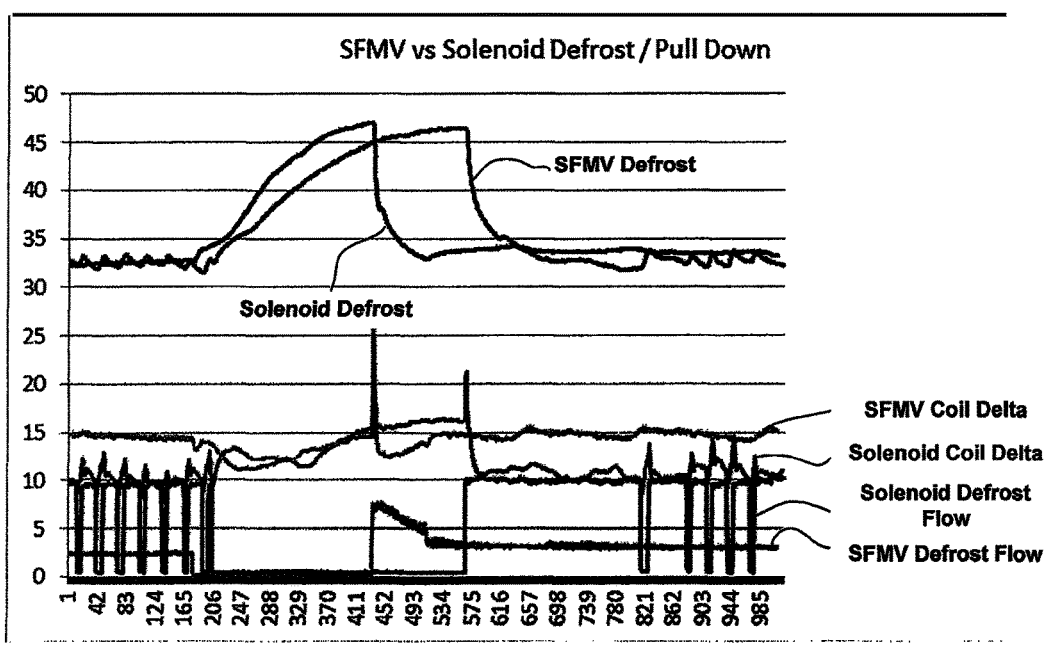
FIG. 7 is a graph comparing defrost and pull-down cycles between a conventional system and a system in accordance with the present invention.

Further, the system in accordance with the present invention also provides enhanced performance for temperature pull-down mode when compared to conventional systems. FIG. 7 provides several graphs showing performance in defrost/pull-down mode. As can be seen, temperature pull-down after a defrost cycle for a system in accordance with the present invention uses significantly less fluid for the same pull-down period when compared to that of a conventional system. Also, the fluid temperature drop ΔT across the heat exchanger 200 is much more stable compared to the conventional system.

Figure 8A:
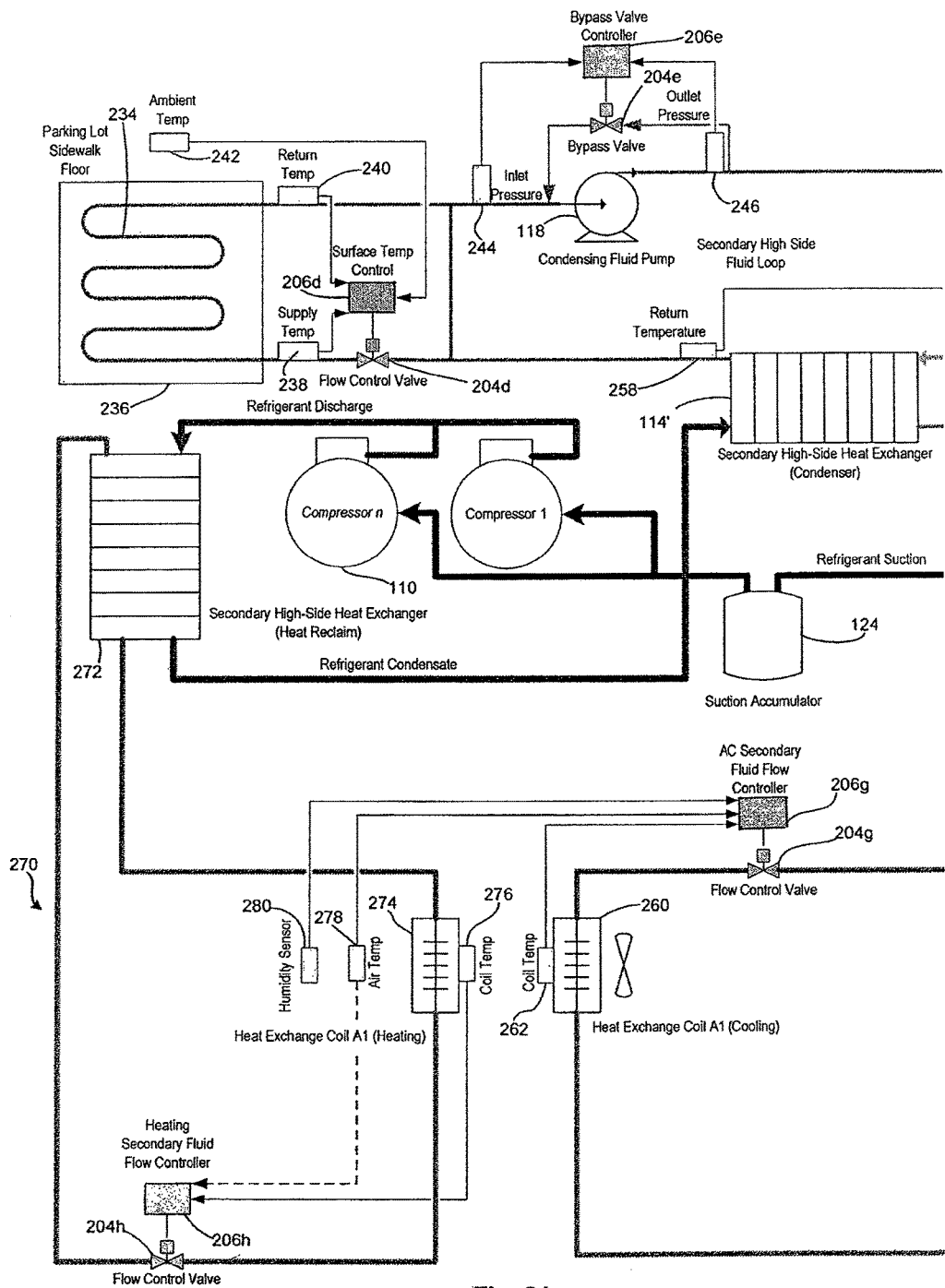
FIGS. 8A and 8B are schematic diagrams illustrating various applications of the system, apparatus and method in accordance with the invention.
Figure 8B:
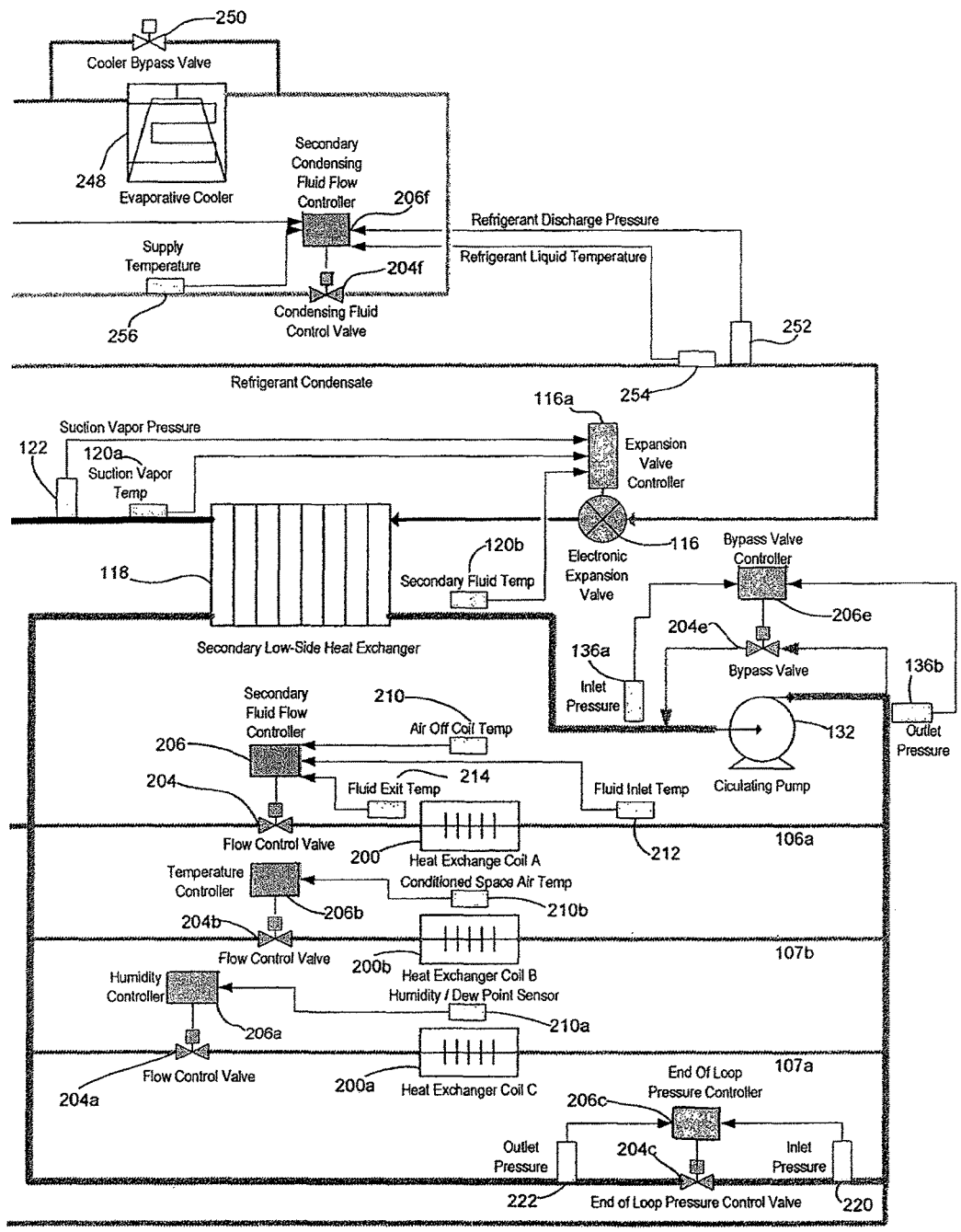

Moving now to FIGS. 8A and 8B, a schematic diagram is provided that shows inventive aspects of the present invention applied to different uses. Many of the features shown in FIGS. 8A and 8B have already been described herein. For sake of brevity, only the additional features shown in FIGS. 8A and 8B will be described below.

Humidity Control

The system and method in accordance with the present invention can control humidity in a conditioned space by controlling secondary fluid flow. For example, and with reference to FIGS. 8A and 8B, a secondary loop 104 may include a branch 107a having a heat exchanger 200a with an inlet that receives secondary fluid from the pump 132 and an outlet that provides secondary fluid to the valve 204a. The valve 204a may be operatively coupled to a controller 206a, where modulation of the valve 204a controls the fluid flow rate through the heat exchanger 200a. A humidity/dew point sensor 210a measures the relative humidity of the discharge air from the heat exchanger 200a, and provides the measurement to the controller 206a. The controller 206a modulates the valve 204a to vary the fluid flow through the heat exchanger 200a so as to maintain the relative humidity of the discharge air (an ambient condition) as measured by the sensor 210a about a desired setpoint. The system may also include a heat exchanger coil temperature sensor (not shown) and/or discharge air temperature sensor to prevent freezing of moisture on the heat exchanger coils.

Temperature Control

The system and method in accordance with the present invention can control temperature in a conditioned space. In this regard, the system is similar to the system for maintaining a refrigerated space 108, except the discharge air temperature sensor may be moved (and renamed) to a central location within the conditioned space. FIG. 8B illustrates a branch 107b for controlling temperature in the conditioned space. The branch 107b is similar to the branch 107a discussed above and therefore only the differences will be discussed here. The branch 107b includes a conditioned space temperature sensor 210b that measures the temperature of the conditioned space and provides the measurement to the controller 206b. The controller 206b modulates the valve 204b to vary the fluid flow through the heat exchanger 200b so as to maintain the temperature of the conditioned space as measured by the sensor 210b about a desired setpoint, e.g., a setpoint determined by a user-operable thermostat or by computer control).

End of Loop Pressure Control

The secondary loop 104 may include an end of loop differential pressure controller for maintaining a preset pressure across the plurality of heat exchangers. In this regard, an additional branch 107c may be added in parallel with the other heat exchanger branches, the additional branch including a valve 204c as described herein operatively coupled to a controller 206c. An inlet of the valve 204c is coupled to the inlet of each heat exchanger, and an outlet of the valve 204c is coupled to an outlet of each heat exchanger (i.e., the valve 204c is in parallel with the heat exchangers). A first pressure sensor 220 measures a pressure of the fluid provided to the inlet of the heat exchangers (which is the pressure provided to the inlet of the valve 204c), and a second pressure sensor 222 measures a pressure of the fluid at the outlet of the heat exchangers (which is the pressure provided at the outlet of the valve 204c). The controller 206c, which receives the measured inlet and outlet pressures, modulates the valve 204c so as to maintain a pressure differential across the valve 204c (and thus across the heat exchangers) at a predetermined setpoint. The end of loop pressure control methodology is advantageous as it enables the pressure across the heat exchanger to be regulated and thus changed based on the needs of the specific application, and also provides stability in fluid flow without the use (and costs) of a variable speed drive.

Surface Temperature Control and Secondary Condensing Fluid Flow Control

As was previously noted, the system and method in accordance with the present invention may be applied to heating a surface, such as a sidewalk, parking lot, roof, etc., which can assist in snow and/or ice removal. In this regard, the flow of high side secondary fluid can be used to heat a surface. Referring to the top-left portion of FIGS. 8A and 8B, an application is provided for heating a surface, such as a sidewalk or parking lot. Similar to the condenser 114 of FIG. 2, the condenser 114' removes heat from the fluid of the primary loop. The condenser 114', however, instead of dissipating the heat energy to the ambient air as shown in FIG. 2, dissipates the energy to a third loop 230, which may be referred to as a secondary high side fluid loop. The heated fluid in the secondary high side fluid loop 230 then is provided to an inlet of a control valve 204d and controller 206d in accordance with the present invention. The outlet of the valve 204d is provided to radiant heat pipe 232 formed beneath the surface 236 to be heated so as to provide radiant heat thereto.

Heat energy in the fluid is radiantly transferred to the surface via the radiant heat piping, thereby increasing the temperature of the surface 236 and decreasing the temperature of the secondary high side fluid. Temperature sensors 238 and 240, which are communicatively coupled to the controller 206d, measure temperature of the fluid entering the radiant heat piping and the temperature of the fluid exiting the radiant heat piping, respectively. In addition, an ambient air temperature sensor 242, which is also communicatively coupled to the controller 206d, measures the temperature at or near the surface 236. The controller 206d determines if heating is required based on the ambient temperature (e.g., if the temperature is above freezing, then heating is not required) and if there is sufficient heat energy to heat the surface (e.g., based on the temperature of the fluid entering the heat exchanger). Monitoring of the fluid exit temperature enables the bypass valve to be selectively operated to shut down portions of the system that may not be needed.

Upon exiting the radiant heat piping 236, the fluid is provided to pump 132, which pumps the fluid through the third loop 230. In the embodiment shown in FIGS. 8A and 8B, the pump is driven by a fixed speed motor (not shown). To regulate pressure within the secondary fluid high side loop 230, a bypass valve 204e and associated controller 206e in accordance with the present invention may be implemented. More specifically, an inlet of the valve 204e is coupled to an inlet of the pump 132', and an outlet of the valve 204e is coupled to an outlet of the pump 132' (i.e., the valve is in parallel with the pump). Inlet pressure sensor 244 and outlet pressure sensor 246 measure the inlet and outlet fluid pressures, respectively, and provide the measured data to the controller 206e. In operation, the controller 206e modulates the valve 204e so as to maintain a desired pressure differential across the pump 132 and/or a desired output pressure at the pump outlet. Such pressure regulation may also be implemented for the secondary loop pump 132. An advantage of using the valve 204e and controller 206e is that it eliminates the need for a variable speed drive, which can reduce initial costs. Further, by sharing valve position between valves 204, 204c, 204e, optimal system fluid circulation can be achieved and low fluid levels can be detected (e.g., by coordinating operation of the valves, system operation can be optimized and costs minimized). Alternatively, pressure regulation in the secondary high side fluid loop 230 may be achieved by driving the pump motor with a variable speed drive in a manner similar to that shown in FIG. 2 and discussed above.

Upon exiting the pump 132 the fluid is provided to an inlet of an evaporative cooler 248, where additional heat is extracted from the fluid and discharged to the external environment. An inlet of a bypass valve 250 may be coupled to an inlet of the evaporative cooler 248, and an outlet of the bypass valve 250 may be coupled to an outlet of the evaporative cooler 248. By controlling the bypass valve 250, further heat may be selectively removed from the loop. For example, the measured return temperature as measured via temperature sensor 240 can be used to bypass the heat exchanger 248 if sufficient heat has already been extracted from the fluid.

The outlet of the evaporative cooler 248 and bypass valve 250 is provided to an inlet of valve 204f, which is modulated by controller 206f. A pressure sensor 252 and temperature sensor 254, which measure the pressure and temperature of the refrigerant in the primary loop 102, and a supply fluid temperature sensor 256 and a return fluid temperature sensor 258, which measure the supply fluid temperature and return fluid temperatures, are communicatively coupled to the controller 206*f*. Based on the measured temperatures and pressures, the controller 206*f* modulates the valve 204*f* so as to maintain the temperature of the fluid in the primary loop 102 at a predetermined target temperature and optimize heat transfer in heat exchanger 114. In other words, the valve 204*f* and controller 206*f* control flow of the high side secondary fluid so as to control the primary loop discharge pressure. Preferably, the controller 206*f* modulates the valve 204*f* to control the discharge pressure of the primary loop to the lowest value while maintain refrigerant sub-cooling to a desired level. In addition, the controller 206*f* can communicate the primary fluid sub-cooling and inlet pressure to the expansion valve 116 to allow for enhanced superheat and temperature control in the secondary low side heat exchanger 118 (e.g., using the pressure and temperature, the amount of sub-cooling can be determined and this enables optimal control of the expansion valve, which can enhance heat transfer in the primary loop to obtain the correct super heat).

Secondary Fluid Flow Control for Air Conditioning and Heating

Referring to the bottom left portion of FIG. 8A, an exemplary secondary fluid control system in accordance with the present invention is illustrated. More specifically, secondary fluid flow is controlled to maintain heat exchanger temperature, conditioned space humidity and conditioned space temperature at desired levels.

For cooling and dehumidification of the conditioned space, fluid from the secondary loop 104 is pumped (via pump 132) to an inlet of heat exchanger 260, and fluid exits an outlet of the heat exchanger 260 and is provided to the inlet of valve 204*g*, which is controlled by controller 206*g*. The outlet of valve 204*g* is provided back to the inlet of heat exchanger 118.

A fourth loop 270 (heat reclaiming loop) includes a secondary high-side heat exchanger 272. More specifically, the fluid circulating in the fourth loop 270 exchanges heat energy with the fluid of the primary loop 102 (the primary loop was discussed above with respect to FIG. 2). The primary loop in FIGS. 8A and 8B is similar to the primary loop in FIG. 2, but includes the aforementioned primary high-side heat exchanger 272.

The purpose of the primary high-side heat exchanger 272 is to reclaim heat energy for heating a space (as opposed to ejecting the heat energy to the outside ambient air). As discussed above with respect to FIG. 2, the compressors 110 of the primary loop 102 compress the primary fluid, thereby heating the fluid. The heat energy in the primary fluid is transferred to the fluid in the fourth loop 270 via the secondary high-side heat exchanger 272.

The heated secondary fluid from the heat exchanger 272 is provided to an inlet of heat exchanger 274 (via a pump—not shown), and fluid exiting an outlet of the heat exchanger 274 is provided to the inlet of valve 204*h*, which is controlled by controller 206*h*. Surface temperature sensors 262 and 276 measure the surface temperature of the heat exchangers 260 and 274, respectively, and provide the measured temperature to the respective controllers 206*g* and 206*h*. In addition, temperature sensor 278 measures a temperature of the conditioned space and provides the measured temperature to both controllers 206*g* and 206*h*, while humidity sensor 280 measures a humidity of the conditioned space and provides the measured humidity to the controller 206*g*.

For humidity control, the controller 206*g* modulates the valve 204*g* so as to regulate the humidity in the conditioned space to a desired level. Further, for temperature control the controllers 206*g* and 206*h* modulate the valves 204*g* and 204*h*, respectively, to cool or heat the conditioned space to a desired temperature. Also, while not shown secondary fluid inlet and outlet temperature sensors could be added to the system to optimize heat exchanger performance. In this manner, the energy used to cool the refrigerated space can be used to heat another conditioned space, thereby reclaiming some of the energy and thus minimizing operating costs.

In addition, when variable speed drives are used for controlling the secondary fluid pumps 132 (e.g., using variable speed drive and motor system to drive the pump 132 in the loops 104, 230 and 270), the respective variable speed drives can detect when there is a reduction in heat load (e.g., via a message communicated over a communication network from a controller 206 to the variable speed drive). Such predictive control strategy enables the variable speed drive to begin throttling down the pump speed (and thus fluid pressure) prior to the defrost event, and also allows the electronic expansion valve 116 to begin closing prior to the defrost event. Such operation provides more stable operation of the system as a whole. Conversely, when a defrost termination signal is received, the respective variable speed drives and electronic expansion valve can be notified of the impending increase in heat load and thus allow the respective sub-systems to prepare for the heat load increase.

Figure 10:
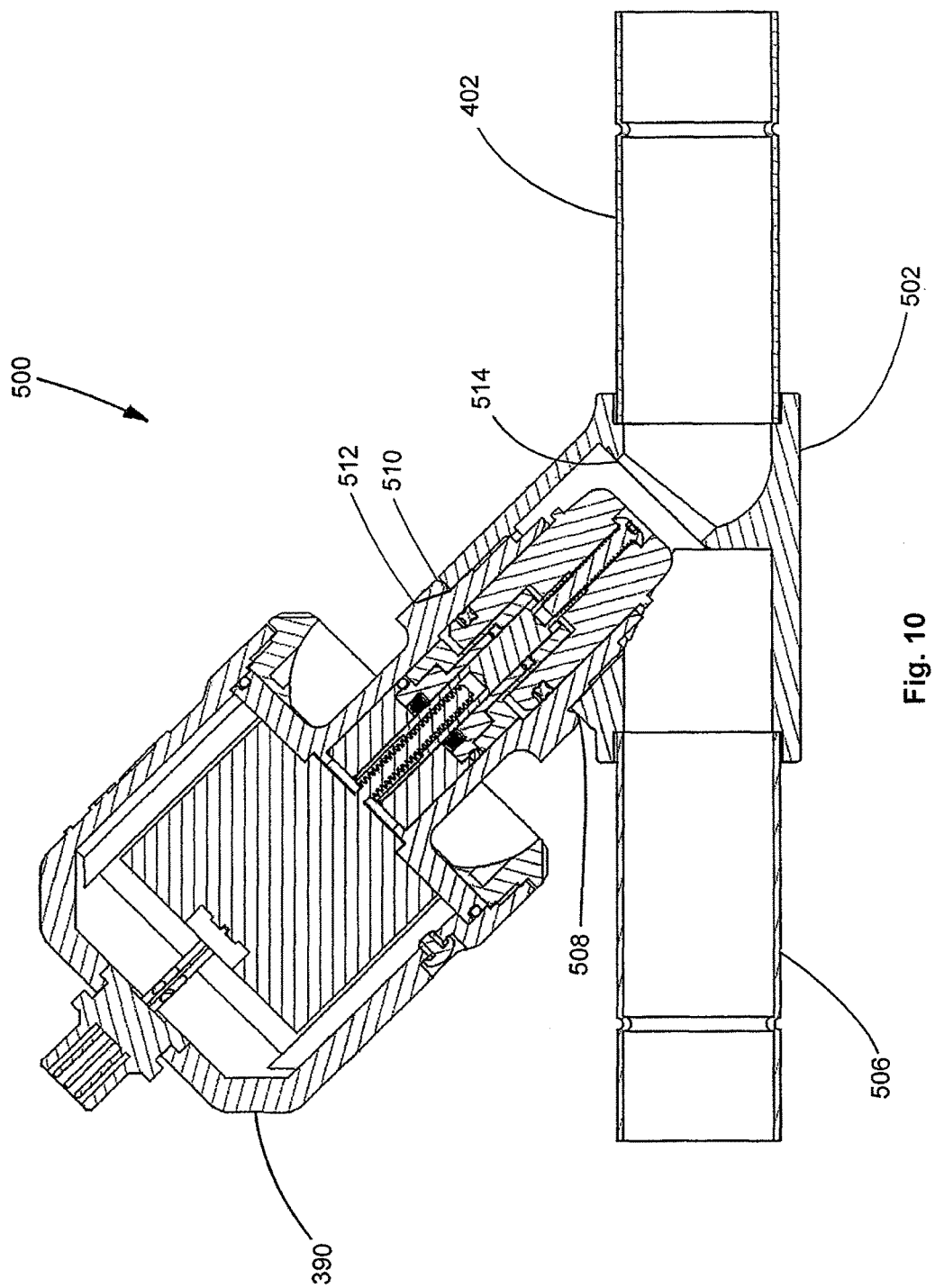
FIG. 10 is cross-sectional view of the motor adapter assembly assembled to the valve body, the valve being shown in a closed position.
Figure 11:
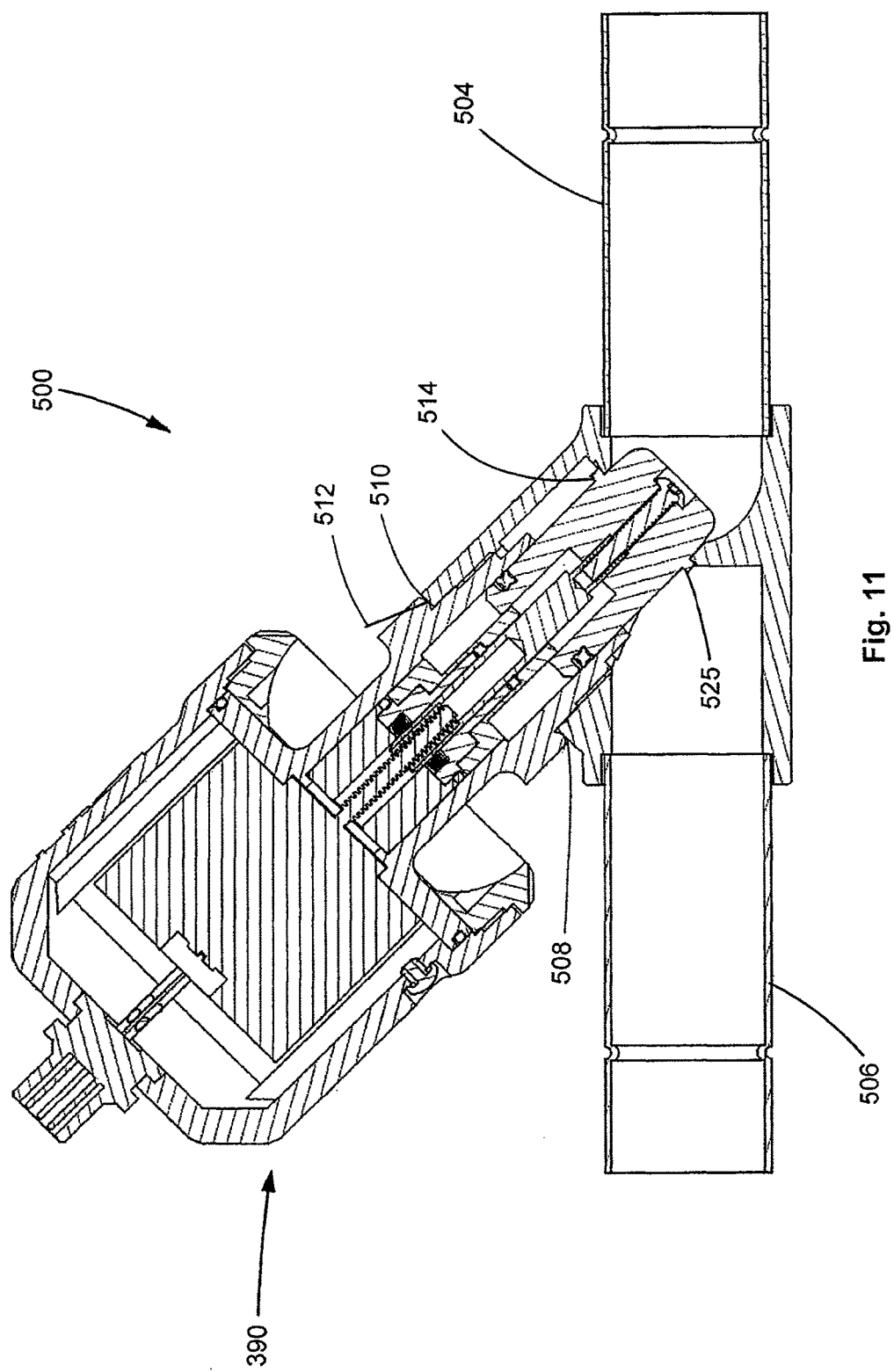
FIG. 11 is a cross-sectional view similar to FIG. 10, but showing the valve in a open position.

Moving now to FIGS. 9-11, FIG. 9 illustrates an exemplary flow control valve 390 that is particularly suited for use as the flow control valve 204 in the above described systems, as well as other applications where continuously variable flow control is desired. The illustrated valve 390 is in the form of a motor adapter assembly configured as a removable cartridge that can be assembled to a valve body 508, such as in the manner shown in FIGS. 10 and 11.

The cartridge 390 includes a motor enclosure 400 that houses a step motor 402. Coupled to the motor 402 is an electric feed-thru 404 which can be used to couple the motor to a power supply and more particularly a controller that controls operation of the motor. The motor also can include a manual motor input 406 for manually opening/closing the valve. The motor enclosure 400 has an open end that is closed by an enclosure nut 408, an adapter 414 and a seal 416. The adapter 414 has a flange 415 that is held by the nut against an interior shoulder of the motor enclosure (cover) 400 and the flange may have in the radially outer surface thereof an annular groove for retaining an annular seal, such as an O-ring, that seals the adapter to the motor enclosure. The nut 408 can be threaded into an internally threaded end of the motor enclosure or otherwise suitably secured to the motor enclosure. Preferably, the motor enclosure can be easily removed from the adapter, such as by unscrewing, so that easy access can be gained to the manual motor input 406 if needed. The enclosure may have a vent plug in the wall of the enclosure. The plug is provided to provide pressure relief if the main seal were to fail and pressure were to build up in the motor enclosure. The enclosure, thus, need not be designed to hold system pressures, only to protect the motor from the ambient environment.

Inside the adapter 414 is a threaded motor shaft 418, which may be an ACME screw. The threads of the motor shaft 418 (or screw) engage a correspondingly threaded portion of a push rod 420 (or nut), which is coupled to a piston 422 that may be made of a metal or a plastic material, as may the other components of the adapter 414 as well as the motor enclosure. The piston 422 and push rod 420 may be coupled together by a piston mount screw 424. The piston includes a sealing element 425, which may be an annular flange. The sealing element 425 seals against a valve seat in a valve body as shown in FIGS. 10 and 11. The piston is reciprocally driven relative to the adapter 414 by the threaded motor shaft 418. Rotational movement of the threaded motor shaft 418 imparts axial movement of the push rod 420 and piston 422. A piston seal 430 is disposed between the piston 422 and the adapter 414 to inhibit the flow of fluid past the piston and adapter clearance that would prevent the valve from fully stopping flow when in the closed position.

The seal 430 enables pressure balancing and tight seating. That is, the piston preferably is semi-balanced with the imbalance being used to keep the assembly loaded in one direction to take up any clearance or looseness thereby to eliminate hysteresis. The cross-sectional area of the piston bore of the adapter is larger than the cross-sectional area of the valve seat so that pressure applied to the back of the piston keeps the piston pushed out of the bore to take up axial play in the threads.

A guide 432 is press fit into or otherwise suitably fixed axial and radial movement in the adapter 418. At least a portion of the guide 432 extends between the push rod 420 and the piston 422. The guide 432 can be an anti-rotation guide that inhibits rotation of the piston when the push rod is driven by the threaded motor shaft. For instance, the portion of the guide 432 over which the piston moves axially may have a noncircular cross-sectional shape, such as square or hexagonal, and the interior bore of the piston in which the guide moves may have a corresponding cross-sectional shape for preventing rotation of the piston. Between the guide 432 and the push rod 420 is an excluder seal 434, which keeps contaminants away from the main seal and provides a redundant seal for the main seal. The guide preferably is made of a suitable bearing material at least at the radially inner and outer surfaces since the guide can be used to support both the push rod and piston during reciprocal movement thereof at sliding interfaces. The guide may be press fit into the adapter so that it will be stationary with respect to the adapter.

Surrounding at least a portion of the threaded motor shaft 418 is a guide or bushing 436, that may be made of brass or other suitable material, and a seal housing 438. A portion of the seal housing 438 is radially outward of the push rod 420 and radially inward of the guide 432. A static seal 440 is disposed between the seal housing 438 and an inner wall of the adapter 414. The static seal seals the bushing 436 to the adapter 414. The seal housing also houses a main seal 442, which may be a spring energized PTFE seal. The main seal inhibits the passage of fluid into the motor windings. The guide is secured in a suitable manner to the adapter, such as by threads or a press fit. The guide may be used to hold the seal housing 438 butted against the bushing 436, and the seal housing may further function to support the push rod along with the bushing and also the guide 432. The bushing, seal housing and guide may be also collectively referred to as a guide for the push rod. The inner end of the seal housing is counterbored to provide an annular space in which the spring energized seal is disposed.

FIGS. 10 and 11 show a valve assembly. The valve assembly 500 includes the removable cartridge 390 assembled to a valve body 502. The valve body 502 can be coupled to and/or integrally formed with an inlet fitting 504 and an outlet fitting 506. The removable cartridge 390 and the valve body 502 can be coupled by a threaded connection 508, and the adapter may be provided with wrenching surfaces for facilitating assembly of the cartridge to the valve body. The adapter can include an edge 510 that forms a knife edge seal 512 with the valve body 502 when the adapter is tightened against the valve body. The valve body 502 includes a valve seat 514 against which the sealing element 425 on the piston abuts to close the valve.

The illustrated valve assembly enables one or more benefits in relation to known valve assemblies. As is preferred, the externally sealed motor shaft 418 is externally threaded for mating with the internal threads on the push rod. This allows the assembly to be more compact. In addition, the threads of the push rod and threaded drive shaft are sealed from the fluid passing through the valve. Further, sealing the drive shaft keeps all magnetized material of the motor or coupling out of the system working fluid to improve reliability in dirty environments.

Low drag spring energized seals also reduce motor torque requirements and improve the sealing ability over a range of temperatures and operating pressures typical on a secondary loop.

In addition, a reciprocating seal allows the translation from rotary to linear motion and a mechanical advantage before drag is added to the assembly by the seal, thus reducing the effect of the seal on required motor torque. Because the need for a rotary seal is avoided by sealing the push rod that only moves axially, a mechanical advantage can be gained through the acme thread before any drag takes effect yielding a higher force output for a given motor torque.

The above-described dual seal approach allows a lower cost elastomer seal to do the majority of the sealing and prevents contamination from reaching the main seal. The use of a Polytetrafluoroethylene based seal as the main seal ensures good lubricity of the seal and long life even in the case where the elastomer seal prevents the working fluid from reaching the main seal. This combination provides the best life and greatest seal integrity over a range of pressures and temperatures in even the dirtiest environments with high duty cycle demands on the seal from the modulating control application.

The direct coupling to the motor shaft allows the valve to be manually adjusted through the motor shaft in case of motor failure, much akin to a manual balancing valve.

Also, a single piece balanced piston incorporates balancing ports, seating surface, flow control geometry, and bi-directional seal gland in one molded body.

The step motor 402 allows the controller to know the relative capacity of the valve for use in system and component diagnostics. The step motor, because of its discrete stepping nature, allows the controller to know with great accuracy how much the motor advances and where the valve is positioned between 0 and 100% stroke. A servo or standard motor would require an encoder or some other means to know where the valve is positioned.

Further, the step motor allows use of the valve in applications having a wide range of flow requirements. In addition, noise abatement is achieved by use of a motorized valve as opposed to noisier solenoid valves commonly used for temperature control.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention.

The invention claimed is:

1. A flow control valve comprising:
   a stepper motor;
   an enclosure for the stepper motor;
   an externally threaded motor shaft driven by the stepper motor;
   a push rod including a bore having a threaded portion in threaded engagement with the motor shaft such that rotation of the motor shaft will effect axial movement of the push rod;
   a piston sealing surface;
   a piston connected to the push rod and having a piston sealing portion for mating with the piston sealing surface, and a valve sealing surface for mating with a valve seat of a valve body;
   a guide for guiding axial movement of the push rod; and
   a first seal for sealing the push rod to the guide,
   wherein the guide comprises a bushing, a seal housing and an anti-rotation guide operative to prevent rotation of the piston, wherein the first seal is retained between the bushing and the seal housing, and wherein along a plane normal to a longitudinal axis of the threaded motor shaft at least a portion of the bore of the push rod, the anti-rotation guide, the seal housing, and the piston sealing surface positionally overlap with one another.

2. The valve of claim 1, wherein the guide is housed in an adapter to which the motor enclosure is removably connected by a threaded connection, and the adapter preferably is configured as a cartridge for threaded receipt in a threaded bore of a valve body.

3. The valve of claim 2, wherein the push rod is guided for axial movement by the adapter.

4. The valve of claim 1, wherein the piston sealing portion comprises a second seal for sealing the piston to an interior surface of the adapter in which the piston is slidably guided.

5. The valve of claim 1, wherein an annular adapter seal is retained between the bushing and the anti-rotation guide for sealing the guide to the interior of an adapter attached to the motor enclosure.

6. The valve of claim 1, wherein the first seal comprises a spring energized Polytetrafluoroethylene seal.

* * * * *